United States Patent Office 3,350,412
Patented Oct. 31, 1967

3,350,412
PROCESS FOR THE PREPARATION OF A PENTAFLUOROPHENYLMAGNESIUM CHLORIDE-TETRAHYDROFURAN COMPLEX
Earl Mark Potrafke, Arden, and Warren Howard Powell, Wilmington, Del., assignors to E. I. du Pont de Nemours and Company, Wilmington, Del., a corporation of Delaware
No Drawing. Filed Aug. 26, 1963, Ser. No. 304,624
4 Claims. (Cl. 260—346.1)

This invention relates to the preparation of pentafluorophenylmagnesium chloride. More particularly, this invention is directed to a process for the preparation of a pentafluorophenylmagnesium chloride-tetrahydrofuran complex.

It is well known that arylmagnesium chlorides are valuable Grignard reagents, useful for the preparation of various compounds. Pentafluorophenylmagnesium chloride is of great value as a synthetic intermediate useful in the preparation of important products obtained by typical Grignard reactions. For instance, by reaction with organomercury chlorides, beneficial alkyl and arylmercury compounds are obtained which have wide utility as insecticides, fungicides and instrument fluids. Other valuable products obtainable from this reagent include acids, alcohols, and other pentafluorophenyl derivatives.

Although these products can also be obtained by reaction of the pentafluorophenylmagnesium bromide or iodide, the starting materials from which these Grignard reagents are prepared are difficult to obtain, namely bromopentafluorobenzene and iodopentafluorobenzene. Recently chloropentafluorobenzene has become readily available and thus a practical process for the preparation of pentafluorophenylmagnesium chloride is most advantageous for the production of pentafluorophenyl derivatives.

Arylmagnesium chlorides and their cyclic ether complexes are generally prepared by reacting the aryl chloride with magnesium in a cyclic ether medium, as described in U.S. Patent 2,959,596. Various halogenated phenylmagnesium chloride-cyclic ether complexes can be prepared by the details given in the above patent. However, the pentafluorophenylmagnesium chloride-tetrahydrofuran complex cannot be obtained in sufficient yields to make the method described in U.S. Patent 2,959,596 economically feasible nor can the pentafluorophenylmagnesium chloride-tetrahydrofuran complex be maintained at the temperatures used in the process disclosed therein.

The reaction for the formation of Grignard reagents is exothermic in nature. It is customarily allowed to proceed at the reflux temperature of the solvent with the application of some cooling, if necessary, to keep it under control.

It has been found unexpectedly that the pentafluorophenylmagnesium chloride-tetrahydrofuran complex is unique in the respect that it is not obtainable in good yields by following the usual procedure for the preparation of Grignard reagents. If the reaction between chloropentafluorobenzene and magnesium in tetrahydrofuran is conducted under the above-mentioned conditions, the temperature at reflux sets off side reactions minimizing the yield of the desired product. Furthermore, any of the desired product which is formed decomposes rapidly at the temperatures utilized in the usual preparation of Grignard reagents.

It has been further discovered that by stringent cooling after initiation of the reaction to maintain the temperature of the initiated reaction below about 35° C. in the range of from about −5° to about 35° C. and preferably below room temperature in the range of from about −5° to about 5° C., and by observing the precaution of not permitting the temperature after completion of the reaction to rise above about 5° C. before subsequent utilization of the Grignard reagent, good yields of the tetrahydrofuran complex of pentafluorophenylmagnesium chloride are obtained.

It is an object of this invention to provide a process for the preparation of a pentafluorophenylmagnesium chloride-tetrahydrofuran complex. A further object is to provide a process wherein the pentafluorophenylmagnesium chloride complex is obtained in good yields. These and other objects will become apparent in the following description and claims.

More specifically, the present invention is directed to a process for the preparation of pentafluorophenylmagnesium chloride and a tetrahydrofuran complex thereof by contacting and reacting magnesium with chloropentafluorobenzene and tetrahydrofuran and after initiation of the reaction maintaining the reaction mixture at a temperature in the range of from about −5° to about 35° C., and maintaining the reaction product after completion of the reaction at a temperature in the range of from about −5° to about 5° C. until used in subsequent reactions.

A more preferred temperature range to be maintained after reaction initiation during the course of the reaction of chloropentafluorobenzene with magnesium in tetrahydrofuran is from about −5° to about 5° C. The most preferred temperature range for this reaction is from about 0° to about 5° C.

These objects are accomplished by the process of this invention as described below. Magnesium is introduced into a previously dried vessel and in the absence of air, preferably in an atmosphere of dry nitrogen. As is customary in the procedure for the preparation of Grignard reagents, the reaction is first initiated by mixing small amounts of the reactants and then adding the rest of the components. Small amounts of tetrahydrofuran, chloropentafluorobenzene and a Grignard initiator, such as a crystal of iodine, are added at a temperature within the range of −5° to 35° C. The mixture is stirred vigorously to initiate reaction. Slight warming may also be necessary. The remaining chloropentafluorobenzene and tetrahydrofuran are added slowly while stirring and cooling. The temperature is lowered to about −5° to 5° C. as rapidly as possible without stopping the reaction.

Alternatively the entire amount of reactants may be charged into the reaction vessel before initiating reaction, although this procedure is not recommended.

The final solution of the obtained pentafluorophenylmagnesium chloride-tetrahydrofuran complex is maintained at about −5° to 5° C. until it is utilized in a subsequent reaction.

Successful results have been obtained utilizing mole/mole amounts of magnesium and pentafluorochlorobenzene together with as little as a five molar equivalents of tetrahydrofuran. Moreover, only the rate of reaction is affected by increased dilution with tetrahydrofuran since it is both a reactant and a solvent in this process. Dilution is only dictated by the economics of the process. More concentrated solutions than the above may be used, but are not practical in that temperature control is made more difficult.

The initation temperature is not critical. The reaction may be initiated at a temperature between about −5° and about 35° C. However, if it is started at about room temperature, cooling is applied immediately to prevent any temperature rise, so that the temperature maintained during the reaction is within the range of about −5° to about 35° C. Regardless of the temperature at initiation, the temperature at completion of the reaction is always maintained in the range of about −5° to about 5° C.

The following examples illustrate ways in which the principles of this invention can be employed but are not to be construed as limiting the invention.

The following example illustrates the process of the invention.

*Example 1.—Pentafluorophenylmagnesium chloride*

To a previously flamed flask, containing magnesium (2.0 g., 0.082 mole) in an atmosphere of dry nitrogen, is added tetrahydrofuran (6 cc.), chloropentafluorobenzene (10 drops), and a single crystal of iodine. The mixture is vigorously stirred at room temperature until the reaction commences (3 minutes, based on the disappearance of the red color due to iodine), and the stirring is continued while a solution of chloropentafluorobenzene (16.2 g., 0.080 mole) in tetrahydrofuran (96 cc.) is added dropwise. The addition is accomplished at such a rate that the reaction mixture is maintained at temperatures of 0 to 5° C. and is completed in 75 minutes. At the end of this time, the reaction mixture is brown in color. The stirring is continued for an additional 15 minutes before a 10.0 cc. sample of the solution is withdrawn for analysis. The aliquot is hydrolyzed and titrated to a methyl orange end-point.

While the reaction mixture is continually stirred, succeeding aliquots are withdrawn for analysis. The analytical data are shown in Table I.

TABLE I.—TITRATION OF PENTAFLUOROPHENYLMAGNESIUM CHLORIDE

| Elapsed Time (in hours) | Temperature (° C.) | Ml. Base Required | Calculated Yield (percent) |
| --- | --- | --- | --- |
| ¼ | 0–5 | 29.8 | 95 |
| 1¼ | 0–5 | 27.9 | 99 |

The elapsed time was calculated after complete addition of the chloropentafluorobenzene solution. The amount of base required was calculated on an average of three titrations.

The effect of temperature is shown by repeating the details of Example 1 at various temperatures. After complete addition of the tetrahydrofuran solution of chloropentafluorobenzene to magnesium, the reaction mixture is stirred for an additional 15 minutes and aliquots are immediately withdrawn for analysis. The yields of the Grignard reagent (pentafluorophenylmagnesium chloride) resulting are shown below.

| Reaction Temperature (° C.) | Yield (percent) |
| --- | --- |
| −25 | 7 |
| 0–5 | 92 |
| 20–25 | 83 |
| 35 | 88 |
| 50 | 54 |
| 68 | 22 |

In order to examine the effect of time on the reaction, the details of Example 1 are repeated at two different temperature ranges and after completion of the reaction aliquots are withdrawn for analysis at various time intervals. For simplicity, these results are depicted graphically.

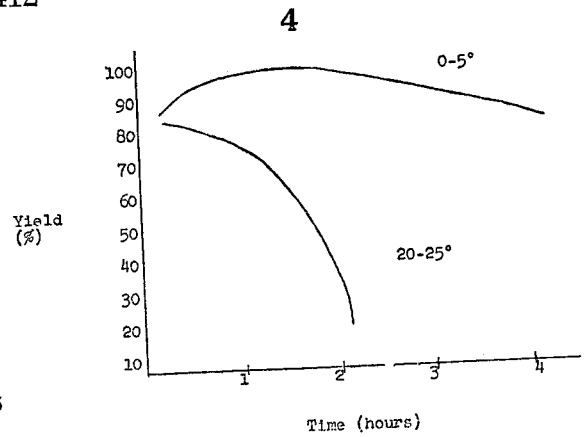

It can thus be seen from the above table and graph that the reaction temperature and the temperature at which the product is maintained are critical in obtaining the desired product in good yield.

Examples 2 and 3 show the preparation of pentafluorobenzene and pentafluorotoluene, respectively, from the freshly prepared pentafluorophenylmagnesium chloride.

*Example 2.—Pentafluorobenzene*

To 2.7 g. (0.11 mole) of magnesium turnings in a flamed 250 ml. flask equipped in the usual manner for Grignard reactions is added 5 ml. of a solution of 20.3 g. (0.10 mole) of chloropentafluorobenzene in 125 ml. dry tetrahydrofuran and a crystal of iodine at room temperature. After the reaction is initiated (5–10 minutes), the reaction mixture is cooled in a salt-ice bath and maintained at 0–5° C. while the remainder of the chloropentafluorobenzene is added (25 minutes). After an additional one hour of stirring at 0–5° C., 10 ml. of water is cautiously added followed by an additional 50 cc. of water and enough 1:1 hydrochloric acid to dissolve the magnesium salts. The layers are separated and the aqueous phase is extracted with 2×100 ml. portions of ether. The combined organic layers are washed with water, saturated salt solution, and dried over anhydrous calcium sulfate. After removal of the solvent on a 20-inch distillation column, the residual oil is fractionated on a 12-inch column to give pentafluorobenzene as a colorless oil, B.P. 84–86° C., $n_D^{25}$ 1.3895.

*Example 3.—Pentafluorotoluene*

Pentafluorophenylmagnesium chloride is prepared as described above. To the stirred Grignard solution at 0° C. is added 15.5 g. (0.11 mole) of methyl iodide. The reaction mixture is stirred for two hours at 0° C. and then at room temperature overnight. Water (50 cc.) and 1:1 hydrochloric acid are added, the layers separated, and the aqueous phase extracted with ether (4×50 ml.). The combined organic phases are washed with sodium bisulfite (2×50 ml.), water (4×100 ml.), saturated salt solution, and dried over anhydrous calcium sulfate. After removal of the solvent, the residual oil is fractionated on a 12-inch column to give pentafluorotoluene as a colorless oil, B.P. 115–117° C. $n_D^{25}$ 1.4007.

The pentafluorophenylmagnesium chloride-tetrahydrofuran complex obtained by this process is kept at a temperature in the range of about −5° to about 5° C. until subsequent reaction. It can be reacted immediately with organomercury chlorides to produce various pentafluorophenylmercury compounds useful as insecticides, fungicides and instrument fluids. This Grignard reagent can undergo all the usual Grignard reactions to form various intermediates. For instance, pentafluorophenylmagnesium chloride can be reacted with ethylene oxide, as shown in U.S. Patent 2,873,297, to form β-pentafluorophenylethanol which can be reacted with organic acids to yield esters, or it may be dehydrated to form a fluorinated styrene, a polymerizable monomer. The Grignard of the invention may also be reacted with esters, as in U.S. Patent 2,873,275, to give carbinols having insecticidal properties.

As many apparently widely different modes of practicing this invention may be utilized without departing from the spirit and scope thereof, it is to be understood that this invention is not limited to the specific embodiments thereof except as defined in the appending claims.

What is claimed is:

1. A process for the preparation of a pentafluorophenylmagnesium chloride-tetrahydrofuran complex which comprises contacting and reacting magnesium with chloropentafluorobenzene and tetrahydrofuran in the presence of a Grignard initiator and maintaining the temperature of the reaction mixture after initiation in the range of from about −5° to about 35° C.

2. A process for the preparation of a pentafluorophenylmagnesium chloride-tetrahydrofuran complex which comprises contacting and reacting magnesium with chloropentafluorobenzene and tetrahydrofuran in the presence of a Grignard initiator and maintaining the temperature of the reaction mixture after initiation in the range of from about −5° to about 35° C. and maintaining the reaction product, said pentafluorophenylmagnesium chloride-tetrahydrofuran complex, after completion of the reaction at a temperature in the range of from about −5° to about 5° C. until subsequent use.

3. A process for the preparation of a pentafluorophenylmagnesium chloride-tetrahydrofuran complex which comprises contacting and reacting magnesium with chloropentafluorobenzene and tetrahydrofuran in the presence of a Grignard initiator and maintaining the temperature of the reaction mixture after initiation in the range of from about −5° to about 5° C.

4. A process for the preparation of a pentafluorophenylmagnesium chloride-tetrahydrofuran complex which comprises contacting and reacting magnesium with chloropentafluorobenzene and tetrahydrofuran in the presence of a Grignard initiator and maintaining the temperature of the reaction mixture after initiation in the range of from about 0° to about 5° C. and maintaining the reaction product, said pentafluorophenylmagnesium chloride-tetrahydrofuran complex, after completion of the reaction at a temperature in the range of from about −5° to about 5° C. until subsequent use.

References Cited

UNITED STATES PATENTS

| | | | |
|---|---|---|---|
| 2,873,297 | 2/1959 | Ramsden et al. | 260—613 |
| 2,921,940 | 1/1960 | Ramsden et al. | 260—346.1 |
| 2,959,596 | 11/1960 | Ramsden et al. | 260—345.1 |
| 2,959,598 | 11/1960 | Ramsden et al. | 260—346.1 |

FOREIGN PATENTS 579,561 7/1959 Canada.

ALEX MAZEL, *Primary Examiner.*

HENRY R. JILES, *Examiner.*

J. H. TURNIPSEED, *Assistant Examiner.*